Patented Jan. 21, 1930

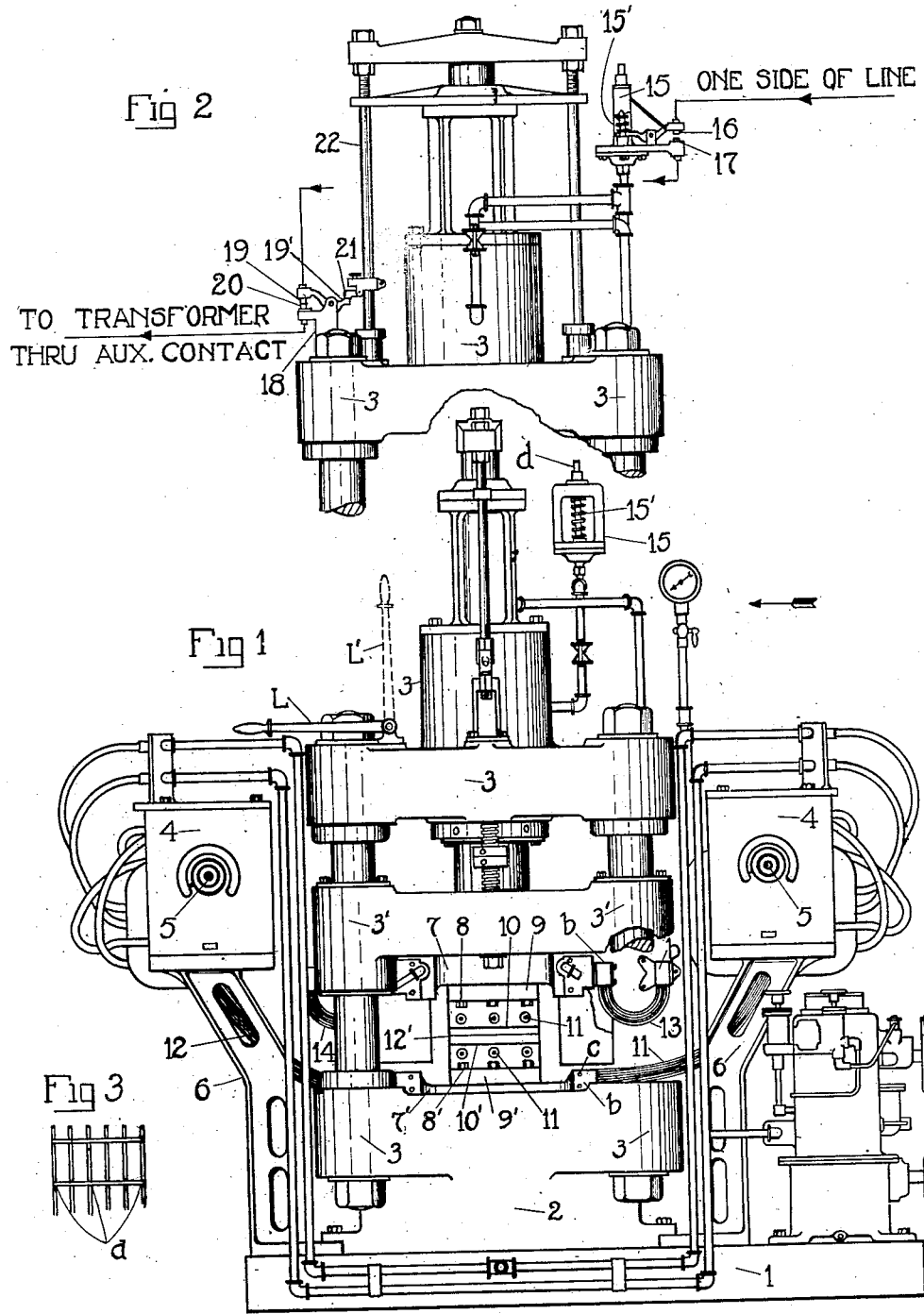

1,744,284

UNITED STATES PATENT OFFICE

FRANCIS H. SPEED, OF LYNN, MASSACHUSETTS, ASSIGNOR TO THOMSON ELECTRIC WELDING COMPANY, A CORPORATION OF MASSACHUSETTS

WELDING AND FORGING BY ELECTRIC-RESISTANCE METHOD

Application filed September 26, 1927. Serial No. 222,102.

My invention relates to apparatus employed in electric welding or other metal working operations such as electric forging and the like.

The machine as I have herein shown and described it is particularly adaptable for use in welding metals to be formed or fabricated in such a way as to produce a metal grid, such as is used in sidewalks, electric central station flooring, and the like.

The heating currents for the machine may be derived from any suitable source, but preferably from the secondary bar or conductor of a transformer in the primary of which is circulated alternating current.

In the present instance, I have preferred to embody the principles of my invention in a multiplicity of transformers, each separately regulated, but all of which transformers feed their heating energy to a single pair of platen-like electrodes having work-engaging surfaces of non-oxidizable and non-deformable metal between which the bars to form the grid are inserted from the required directions, and which are welded at their intersections in order that the bars constituting the latter may be fabricated into a unitary grid structure. The object of using four transformers in this case is that an even distribution of heat is readily secured at the points of fusion or weld of the grid bars.

Coordinated with the means for heating the electrodes are suitable means for regulating the amount of pressure to be applied to the work (cross-bars), and also means for automatically cutting off the current which supplies heating energy to the electrodes at a suitable interval subsequent to the application of the pressure means, the predetermined pressure and interval of application of the current being such that there will be no burning of the metal at the points of welding and no undue resistance offered at these points beyond that which is necessary to satisfactorily effect the welds with the use of a minimum amount of electrical energy.

My invention will be better understood and more clearly illustrated by referring to the accompanying specifications and drawings, in which Fig. 1 is an elevation of a machine embodying the principles of my invention; Fig. 2 is an enlarged elevation of the hydraulically actuated pressure means for applying pressure to the work and illustrating the electrical contacting arrangement for cutting off the current after a predetermined interval of application thereof, the view being taken in the direction of the arrow, Fig. 1; Fig. 3 represents a grid after the bars constituting the latter have been fabricated and welded into a unitary structure.

Referring more specifically to Fig. 1 of the drawing, 1 represents the base of the machine, 2 a pedestal thereon for supporting the hydraulic press 3; 4—4 represent low voltage welding transformers mounted on either side of the hydraulic press, and each transformer being provided with a suitable regulator 5—5. In view of the fact that the figure is in front elevation it is to be understood that on the rear of the machine are two other transformers in corresponding locations, or making a total of four transformers in all. These transformers are supported on the base 1 by means of the structural iron supports 6—6. To the electrode 7 is rigidly secured by the series of bolts 8, a die holder 9, and similarly secured to the lower electrode 7' by bolts 8' is a die holder 9'. Carried in these die holders are complementary parts of a die 10, 10' made of bronze or other suitable material, such as a special intermixture of tungsten and copper. These dies constitute working surfaces for the electrodes 7, 7' and are less deformable under heat and pressure than the main body of the electrodes. The electrodes 7, 7' are of massive copper or other good electrically conducting metal. Suitably connected to the electrodes 7, 7' are heavy secondary leads 11, 12, 13 and 14, their terminals being shown at $b$ in the drawing. Whereas all the secondary leads and terminals do not show in the drawing, it is to be understood that in the arrangement of the invention, transformers are connected to the platen at each of the four corners of the latter. One end of the secondary of each transformer being connected to the top platen or electrode, and the other end connected to the lower platen; thus, connecting the secondaries of the four transformers in parallel circuit. Between the upper and lower dies is a suitable clearance or opening 12' into which may be inserted by an automatic process (not a part of this invention) grid members or bars to be welded or fused into a unitary grid structure. The usual water cooling arrangements for the electrodes and means for actuating the hydraulic ram, as is common in such apparatus, are shown in the drawing and need no further detailed description here. It may be stated, however, that after the bars have been inserted between the dies 10, 10' and in a manner illustrated in Fig. 3, the hydraulic pressure of the ram is set into operation by actuating the valve lever L thus causing the ram 3' to move down onto the work held between the dies 10, 10' and the pressure is built up to the predetermined point, at which time the current is automatically applied by a suitable electrical contacting switch 15 (the contacts 16 and 17 thereof closing said circuit), and after being maintained for the required period, that is, until the metal of the grid softens and unites, the circuit is broken by switch 18 and the pressure may be relieved by means of the lever L, causing the ram 3' to return to its original position. The arrangements for applying and relieving pressure by the ram and the actuation of the current for operating the relay and throwing on the main transformer switches, etc., will be described more in detail hereinafter.

Referring more particularly to Fig. 2, 15 represents a contacting switch having contacting members 16 and 17 in operative relation with the spring 15' of the switch 15. An adjusting nut d on the frame of the switch and regulating device 15' permits the latter to be so adjusted that it will operate upon a predetermined pressure of the hydraulic ram being attained. Once having been set and this predetermined pressure having been reached upon the descent of the ram 3' to apply pressure to the dies, the spring 15' causes a closure of the contacts 16 and 17, thus completing the circuit through one side of the line, the circuit on this side of the line being completed through another switch 18 the contacts of which 19 and 20 have been previously closed. A return circuit is provided but not shown and the auxiliary circuit above described is so arranged as to operate a contactor for throwing in the main power line or completing the main supply circuit line which operates the transformers. A trigger 21 on the movable member 22 of the hydraulic ram 3' is so adjusted that it will open the contacts 19 and 20 after the ram 3' has descended a little bit in addition to its original descent, this additional increment or drop being due to the softening of the metal at the weld upon the continued application of the current for a time interval.

The complete operation of the invention is as follows: The bars which are to constitute the grid are automatically fed into the opening 12' between the dies 10, 10'. The operator moves the lever L in the required direction to apply the hydraulic pressure by the ram 3', the latter descends and builds up a predetermined pressure on the work at 12' at which time the predetermined pressure operates the spring 15' of the switch 15 to close the contacts 16 and 17 thus causing a completion of the auxiliary circuit through the switch 18, contacts 19 and 20 of which have been previously closed. The completion of this circuit (the other side of which is not shown) throws an auxiliary contactor to operate a main switch in the power supply circuit (not shown). This action throws the heating current onto the dies by passing it to the transformers and from the secondaries of the transformers through the secondary leads 11, 12, 13 and 14 to the secondary terminals b, copper electrodes 7, 7', die holders 9, 9' and dies 10, 10' to the work in the opening at 12'. After a sufficient time interval and under the influence of the predetermined pressure fusion of the bars of the grid at a (Fig. 3) takes place, a slight softening of the metal ensues, the ram 3' descends a trifle more due to this softening, causing the trigger 21 on the member 22 to trip contact 19', opening the contacts 19 and 20 which in turn opens the auxiliary circuit and throws off the main switch from the main power supply line. The operator now moves lever L in a reverse direction (L') to that originally given to it, the ram 3' ascends to its normal position, closing switch 20 and opening switch 15, and the whole apparatus is in readiness for a repetition of the operation to weld another cross bar. This repetition continues until all the cross bars have been welded to produce the finished grid.

What I claim as new and desire to secure by Letters Patent of the United States is:—

1. In an electric metal working apparatus, the combination of a welding transformer having suitable primary terminals for receiving a current supply, massive platen-like electrodes, die holders and dies connected with said massive electrodes for heating bars of metal inserted between the dies and crossed to form a grid and be integrally united at their intersections, secondary terminals for the transformer connected to the massive electrodes to supply current thereto, pressure-operated means comprising a ram for applying a predetermined pressure to the grid during the operation of welding, two sets of electrical contacts operated by the movement of the ram one set being closed on the normal descent of the ram to complete the circuit through the second set of contacts thereby closing a power circuit, and tripping means for opening the second set of contacts upon the further descent of the ram as the metal of the grid softens under the welding temperature.

2. In an electric metal working apparatus, the combination of a plurality of welding transformers, massive platen-like electrodes, secondary terminals connecting the plurality of transformers to said massive electrodes, die holders and dies connected with said massive electrodes to heat bars of metal inserted between the dies and crossed to form a grid and be integrally united at the intersections of said bars, pressure operated means comprising a ram for applying a predetermined pressure to the grid during the operation of welding, two sets of electrical contacts operated by the movement of the ram, one set being closed on the normal descent of the ram to complete the circuit through the second set of contacts, thereby in turn closing a power circuit, and tripping means for opening the second set of contacts upon the further descent of the ram as the metal of the grid softens under the welding temperature.

FRANCIS H. SPEED.